(12) United States Patent
Iwai et al.

(10) Patent No.: US 6,857,658 B2
(45) Date of Patent: Feb. 22, 2005

(54) GAS GENERATOR FOR AIR BAG AND AIR BAG APPARATUS

(75) Inventors: Yasunori Iwai, Osaka (JP); Katsuhito Miyaji, Hyogo (JP); Atsushi Hatomoto, Hyogo (JP); Toshirou Iwakiri, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 48 days.

(21) Appl. No.: 10/095,073

(22) Filed: Mar. 12, 2002

(65) Prior Publication Data

US 2002/0175509 A1 Nov. 28, 2002

(30) Foreign Application Priority Data

Mar. 15, 2001 (JP) ........................................ 2001-073948
Jul. 12, 2001 (JP) ........................................ 2001-211607

(51) Int. Cl.[7] .............................................. B60R 21/26
(52) U.S. Cl. ...................................... 280/741; 102/531
(58) Field of Search ................................ 280/736, 740, 280/741, 742; 102/530, 531

(56) References Cited

U.S. PATENT DOCUMENTS 4,530,516 A * 7/1985 Adams et al. ............... 280/741

6,364,354 B1   4/2002 Nakashima et al.

FOREIGN PATENT DOCUMENTS

| DE | 4019677 A | * | 1/1992 | ........... B60R/21/26 |
| DE | 19620758 A1 | | 11/1997 | |
| EP | 1136330 A1 | | 9/2001 | |
| JP | 6-39631 U | | 5/1994 | |
| JP | 9-132494 A | | 5/1997 | |
| JP | 9-183359 A | | 7/1997 | |
| JP | 2000-335361 A | | 12/2000 | |
| WO | 00/18618 A1 | | 4/2000 | |
| WO | WO 200066402 A1 | * | 11/2000 | ........... B60R/21/26 |

* cited by examiner

Primary Examiner—Peter C. English
(74) Attorney, Agent, or Firm—Birch, Stewart, Kolasch & Birch, LLP

(57) ABSTRACT

Gas generator for air bag to secure safety and reliability in operation while reducing size of container in a simple structure with reduced number of parts. With this gas generator, ignition and combustion performance of the gas generating agent are enhanced. A partition wall member defines the inner space of a housing into at least two chambers in the gas generator, a disk-like dividing member is disposed inside the partition wall member, a peripheral surface of the dividing member is provided with a pawl spreading like a petticoat toward a skirt portion of the partition wall member, and the pawl is fitted into a groove circumferentially formed in an inner peripheral surface of the annular peripheral wall.

10 Claims, 5 Drawing Sheets

GAS GENERATOR FOR AIR BAG AND AIR BAG APPARATUS

TECHNICAL FIELD TO WHICH THE INVENTION BELONGS

The present invention relates to a gas generator for an air bag which is preferably used for an air bag disposed in a vehicle for protecting a passenger from the impact, and an air bag apparatus using the same.

PRIOR ART

An air bag system, which is mounted on various kinds of vehicles and the like including automobiles, aims to hold an occupant with an air bag (a bag body) rapidly inflated with a gas and to prevent the occupant from crashing into a hard portion inside the vehicle such as a steering wheel, a windscreen due to an inertia and getting injured when the vehicle collides at a high speed. This kind of air bag system generally comprises a gas generator which is to be actuated by the collision of a vehicle and discharge a gas, and an air bag which introduces the gas to inflate.

It is desired that the air bag system of this type can safely restrain the occupant even when frame of the occupant (for example, whether a sitting height is long or short, whether an adult or a child, and the like), a sitting attitude (for example, an attitude of holding on the steering wheel) and the like are different. Then, there has been conventionally suggested an air bag system which actuates, applying an impact to the occupant as small as possible at the initial stage of the actuation. Such a gas generator is disclosed in JP-A No. 9-183359 and DE-B No. 19620758. In these documents, gas generators, in which two combustion chambers storing a gas generating agent are provided in a housing and an igniter is arranged in each combustion chamber, and an activation timing of each of the igniters is adjusted to control an activation output of the gas generator, are disclosed. However, in any of the gas generators, the igniters arranged in the respective combustion chambers are independently arranged, which makes the assembly (manufacture) difficult, the structure of the gas generator complicated and a volume thereof large. In these gas generators, since the number of parts constituting the gas generators is large, the producing cost has to be improved. The gas generator is used for securing safety of a passenger and thus, it is not sufficient to merely cut the producing cost, but the reliability and safety in the operation has to be secured.

The air bag system is mounted to an automobile for protecting a passenger from the impact at the time of collision, and the air bag system rapidly generates a gas by actuation of the gas generator for an air bag to inflate an air bag (bag body).

In a general gas generator, if an ignition means is actuated by the impact, the ignition means ignites and burns a gas generating agent to generate a high temperature and high pressure gas, and the generated gas is ejected through a gas discharging port into the air bag (bag body).

Therefore, in order to adjust the inflating degree of the air bag, it is necessary to adjust the operation performance of the gas generator. In order to adjust the operation performance of the gas generator, the combustion of the gas generating agent has to be optimized. For this purpose, it is preferable that the gas generating agent charged in a combustion chamber is effectively and reliably ignited and burned by actuation of the ignition means.

Meanwhile, the ignition means for igniting and burning the gas generating agent may comprise only an igniter which is actuated by the actuation signal, and in addition, the ignition means may be used in combination of the igniter and a transfer charge which is to be ignited and burned by the actuated igniter. A position, a shape and a volume of a combustion chamber in which the gas generating agent is accommodated are variously designed depending upon a shape of a housing and positions of necessary constituent members, and a shape and a composition of the gas generating agent which is charged into the combustion chamber are also variously selected.

Therefore, when the gas generator is produced, it is necessary to adjust the interior structure of the gas generator for optimizing the operation performance of the gas generator.

However, the conventional gas generator has to be improved concerning the ignition performance of the gas generating agent.

DISCLOSURE OF THE INVENTION

Accordingly, the present invention (I) provide a gas generator for an air bag in which operation safety and reliability are secured while restricting the total size of a container and having a simple structure with the reduced number of parts to be produced easily.

In order to solve the above problem, in a gas generator for an air bag of the present invention in which a partition wall member is disposed in a housing and the inner space of the housing is divided into at least two chambers, a structure of the dividing member disposed inside the partition wall member, a supporting structure of the dividing member and a structure, in which the dividing member and the ignition means are combined, are improved.

That is, the present invention provides a gas generator for an air bag comprising a housing having a gas discharging port, and a partition wall member having an annular peripheral wall disposed to divide the inner space of the housing into at least two chambers, wherein a disk-like dividing member extending in a radial direction of the annular peripheral wall is disposed inside the partition wall member, a peripheral surface of the dividing member is provided with a pawl spreading like a petticoat in thickness direction thereof, and the pawl is fitted in a groove circumferentially formed in an inner peripheral surface of the annular peripheral wall.

The pawl of the peripheral surface of the dividing member may spread like a petticoat toward the skirt portion of the partition wall member. The skirt portion of the partition wall member indicates a portion in the axial end side of the partition wall member where the igniter exists if the ignition means comprising the igniter inside the partition wall member is accommodated. And, if the housing is formed by a cylindrical diffuser shell with a top having a gas discharging port and a closure shell forming the inner space together with the diffuser shell, it indicates a portion in the axial end side of the partition wall member inside the closure shell.

Accordingly, in the above gas generator, when the ignition means comprising the igniter is accommodated inside the partition wall member and the igniter is arranged in the skirt portion side of the partition wall member, the pawl provided in the peripheral surface of the dividing member can be formed to spread toward the skirt portion of the partition wall member.

The partition wall member defines the inner space of the housing into at least two chambers, and the partition wall member includes at least an annular peripheral wall. The partition wall member can be formed into a cylindrical shape or a cylindrical shape with a top. The dividing member is for dividing the inside of the partition wall member into the two chambers, and is formed into a disk-like shape spreading in the radial direction of the annular peripheral wall. Accordingly, this dividing member is formed into such a shape to axially close the inside of the partition wall member, for example, into a shape of a horizontal cross section of the inside of the partition wall member.

With this design, the inside of the partition wall member can easily and reliably divided by the disk-like dividing member. In other words, the dividing member can be prevented from being dislocated because of the pawl fitted into the groove, and further, sealing between the partition wall member and the dividing member can be realized. In addition, if a periphery edge of the dividing member is fitted into the groove formed in the inner surface of the partition wall member, the dividing member can be fixed reliably by the periphery edge and the pawl. Further, if a tip end and part or all of the outer peripheral surface of the pawl contact closely to the side surface or the bottom surface of the groove in the partition wall member, sealing between the dividing member and the partition wall member can be reliably obtained. The dividing member formed in this manner can be easily and reliably disposed inside the partition wall member because the tip of the pawl is fitted into the groove, and sealing between the partition wall member and the dividing member can be realized.

In the gas generator of the present invention, the disk-like dividing member extending in the radial direction of the annular peripheral wall is disposed inside the partition wall member to define the ignition means accommodating chamber in the skirt portion side of the partition wall member, and a recess hollowed in the thickness direction of the dividing member is provided on the surface in the ignition means accommodating chamber side of the dividing member to store part of the ignition means which activates upon receiving the activation signal. In case of the ignition means including an igniter to receive the activation signal and a transfer charge to be ignited and burnt due to activation of the igniter, the transfer charge can be stored in the recess. The transfer charge is provided into the recess, being stored into a container made of a resin or metal. In this case, the container storing the transfer charge has to be formed to break at least due to the activation of the igniter, a material and thickness need to be selected on the basis of this demand.

Particularly, an amount of the transfer charge is an important element related to the operation performance of the gas generator, and if the recess is formed larger in the widthwise direction of the dividing member in the gas generator, a sufficient amount of the transfer charge can be arranged. In this case, it is possible to suppress the depth of the recess, and if the width and depth of the recess are adjusted, the flame generated due the actuation of the igniter can reach the entire transfer charge, thereby effectively burning the transfer charge. And, if the electric ignition type igniter constituting the ignition means is disposed to abut against the container accommodating the transfer charge, the transfer charge can be reliably ignited and burnt.

When the dividing member is formed and a necessary transfer charge accommodating space is secured in this manner, for example, even in a gas generator in which a second combustion chamber storing a second gas generating agent is formed in the opposite side of an ignition means accommodating chamber partitioned with the dividing member, the dividing member never protrudes into the second combustion chamber. In other words, it is possible to suppress the axial length as much as possible while securing the space required for the second combustion chamber, and the dividing member can be disposed at a sufficient distance from the skirt portion of the partition wall member. Consequently, in even a gas generator in which the first combustion chamber is provided radially outside the partition wall member and the annular peripheral wall of the partition wall member is formed with the first flame-transferring hole for ejecting a flame generated due to combustion of the transfer charge into the first combustion chamber, the first flame-transferring hole can be formed in the vicinity of the axial center of the first combustion chamber, and the flame ejected from of the flame-transferring hole can reach the entire inner space of the first combustion chamber. Accordingly, the ignition and combustion performance of the first gas generating agent accommodated in the first combustion chamber can be improved, and a gas generator capable of exhibiting the desired operation performance can be obtained.

Further in the gas generator of the present invention, a disk-like dividing member extending in the radial direction of the annular peripheral wall is disposed inside the partition wall member arranged in the housing, an ignition means accommodating chamber is defined in the skirt portion side of the partition wall member, an ignition means comprising at least two igniters is accommodated in the ignition means accommodating chamber, the igniters are integrally formed with resin, one of the igniters is accommodated in a space which is defined by a cylindrical container integrally formed with the resin holding the igniters, and a dividing member closing the cylindrical container.

With this design, even when the ignition means comprises two or more igniters, one of the igniters can be disposed in a space reliably defined by a simple structure. Consequently, the igniter can independently be actuated without receiving any influence of the other igniter. Especially when the second combustion chamber accommodating the second gas generating agent is formed in the opposite side of the ignition means accommodating chamber partitioned with the dividing member and the igniter (second igniter, hereinafter) is disposed in the space formed by the cylindrical container and the dividing member to ignite and burn the second gas generating agent, it is preferable that a communication hole capable of communicating the second combustion chamber with the space accommodating the second igniter is formed in the dividing member, and that sealing (i.e., hermetic sealing) between the cylindrical container and the dividing member can reliably be obtained.

Thereupon, preferably, the dividing member is provided with a communication hole formed at an axially opposite position to the igniter stored in the cylindrical container and with an annular groove formed at an axially opposite position to an end surface of the cylindrical container to surround the communication hole. Further preferably, an o-ring is provided in the annular groove to seal tightly and reliably between the dividing member and the axial end surface of the cylindrical container. With this design, the accommodating space of the second igniter and the combustion chamber can be unfailingly separated from a space accommodating other igniter by a simple structure. In this case, in order to seal between the cylindrical container and the dividing member, other structure can be employed naturally.

In the above gas generator, two ignition means are disposed in parallel to a single collar member, and the igniters and the collar member are integrally formed, and one of the igniters is an initiator assembly stored in the cylindrical container formed integrally by the resin. In the initiator assembly, the entire periphery of at least one of the igniters is surrounded with the cylindrical container formed integrally by the resin.

And, in order to dispose one of the igniters in a space separated from the other igniter, one of the igniters can be accommodated inside a cylindrical seal cup member which is divided from the space where the other igniter exists. For example, an opening portion spreading radially is formed in the lower end side of the seal cup member, an upper end thereof is press-fitted into a groove formed in the dividing member, and an O-ring is arranged inside the opening portion, between the cup member and the igniter stored inside the cup member, thereby sealing between the igniter and the seal cup member.

In the gas generator of this invention, the above features, i.e., inventions described in the claims of this description can arbitrarily be combined. More specifically, in the gas generator for an air bag in which the partition wall member having the annular peripheral wall is disposed in the housing having the gas discharging port, the inner space of the housing is defined into at least two chambers, the ignition means comprising an igniter is accommodated inside the partition wall member, the igniter is disposed in the skirt portion side of the partition wall member, and the following features (i) to (iii) can be arbitrarily combined.

(i) A gas generator for an air bag in which the disk-like dividing member extending in a radial direction of the annular peripheral wall of the partition wall member is disposed inside the partition wall member, a peripheral surface of the dividing member is provided with a pawl spreading like a petticoat in its thickness direction or toward a skirt portion of the partition wall member, and the pawl is fitted in a groove circumferentially formed in an inner peripheral surface of the annular peripheral wall.

Further, the gas generator for an air bag in which a peripheral edge of the dividing member is fitted into the groove formed in an inner surface of the partition wall member, or a tip end of the pawl of the dividing member and part or all of the outer peripheral surface of the pawl contact tightly with a side surface or a bottom surface of the groove of the partition wall member.

In addition, the gas generator for an air bag in which the ignition means accommodating chamber is provided inside the partition wall member as well as in the tip end side of the pawl in the dividing member, and the ignition means comprising the igniter to receive the activation signal and the transfer charge to be ignited and burned by actuation of the igniter is accommodated in the ignition means accommodating chamber.

(ii) A gas generator for an air bag in which a disk-like dividing member extending in the radial direction of an annular peripheral wall of the partition wall member is disposed inside the partition wall member, an ignition means accommodating chamber is defined in the skirt portion side of the partition wall member, the surface of the dividing member on the side of the ignition means accommodating chamber is formed with a recess which is recessed in a thickness direction of the dividing member to store part of the ignition means which is actuated upon receiving the activation signal.

Further, the gas generator for an air bag in which the ignition means comprises an igniter to receive the activation signal and a transfer charge to be ignited and burned by actuation of the igniter, and the transfer charge is accommodated in the recess.

Further, the gas generator for an air bag in which an electric ignition type igniter constituting the ignition means is disposed to abut against and face a container accommodating the transfer charge.

(iii) A gas generator for an air bag in which a disk-like dividing member extending in the radial direction of the annular peripheral wall of the partition wall member is disposed inside the partition wall member, an ignition means accommodating chamber is defined in the skirt portion side of the partition wall member, an ignition means comprising at least two igniters is accommodated in the ignition means accommodating chamber, the igniters are integrally formed by resin, and one of the igniters is accommodated in a space which is defined by a cylindrical container integrally formed by the resin holding the igniters and a dividing member closing the cylindrical container.

Further, the gas generator for an air bag in which the dividing member is provided with a communication hole formed at an axially opposite position to the igniter stored in the cylindrical container and with an annular groove formed at an axially opposite position to the end surface of the cylindrical container to surround the communication hole, and an o-ring is provided in the annular groove to seal tightly and reliably between the dividing member and the axial end surface of the cylindrical container.

The same effect as that of the (iii) can be obtained by accommodating one of the igniters inside the cylindrical seal cup member divided from the space where the other igniter exists. For example, the opening portion spreading radially is formed in the lower end of the seal cup member, an upper end thereof is press-fitted into the groove formed in the dividing member, and the O-ring is arranged inside the opening portion, between the cup member and the igniter accommodated in the seal cup member, thereby sealing between the igniter and the seal cup member.

In particular, by obtaining the features of (ii) and (iii), because a single dividing member defines the ignition means accommodating chamber, a gas generator, in which manufacturing can be facilitated, the number of the constituting elements can be reduced and a necessary space for accommodating the transfer charge can be obtained by forming the recess, is be obtained, and thereby, a satisfactory operation performance of the gas generator can be obtained.

Further, by combining the feature of (i) with either or both of the (ii) and (iii), it is possible to further simplify the structure of the gas generator. This can be realized because the dividing member dividing the inner space of the partition wall member also have a sealing function between the divided spaces with a pawl which is formed on the periphery of the dividing member and seals between the partition wall member and the dividing member.

The gas generator of the present invention can be realized by a gas generator having one combustion chamber in the housing, but it is preferably realized by a gas generator in which two combustion chambers are provided inside the housing and the gas generating agent accommodated in each of the combustion chambers can be independently ignited and burned. In general, such a gas generator is considered to have a complicated structure, however, if the features of the present invention are provided, the gas generator can be formed with smaller number of constituent members. Particularly, if the gas generator have a structure such that the first combustion chamber is provided radially outside the partition wall member, that the dividing member is disposed inside the partition wall member to define the second combustion chamber and the ignition means accommodating chamber, and that both the chambers are arranged side by side in the axial direction, it is possible to reduce the producing cost based on the reduced number of parts, and the weight and the size of the gas generator can be also reduced. Accordingly, the gas generator of the present invention in which the structure and configuration are simplified and the producing cost is reduced can satisfy a demanded performance at the time of actuation and unfailingly exhibit the performance. In other words, according to the present invention, it is possible to realize a gas generator in which satisfactory operation performance and operation reliability are secured and the producing cost is reduced.

The resilient supporting member for supporting the second gas generating agent can be disposed in the second combustion chamber. The resilient supporting member may include a resilient member and a flat plate-like circular supporting surface which spreads and is accommodated in the radial direction of the second combustion chamber. As the resilient member, various springs such as coil spring and leaf spring can be used. Particularly, if a Belleville spring is used, it is easily combined with the supporting surface, and as a result, it becomes easier to produce the gas generator and the producing cost is reduced.

In the gas generator of the present invention, known technique can be used for constituent elements other than those described above, such as gas generating agent, a coolant means (or filter means) for purifying or cooling gas generated by combustion of the gas generating agent, and a plate member or cushion member for supporting the gas generating agent.

The gas generator for an air bag is accommodated in a module case together with the air bag (bag body) introducing a gas generated by the gas generator to inflate, thereby forming an air bag apparatus. In the air bag apparatus, the gas generator is activated upon the impact sensor detecting the impact, and a combustion gas is discharged from the gas discharging port of the housing. The combustion gas flows into the air bag, the air bag ruptures the module cover and inflates, and forms a cushion for absorbing the impact between hard structural elements in the vehicle and the passenger.

According to the gas generator of the present invention, the structure is simplified based on the reduced number of parts so that the manufacturing is facilitated, and further, the producing cost can be reduced. In the gas generator, the overall size of the container can be restricted, and safety and reliability in operation can be secured.

Further, the present invention (ii) provides a gas generator in which the ignition and combustion performance of the gas generating agent is enhanced by improving the interior structure of the gas generator, and operation performance is also enhanced.

According to the gas generator for an air bag of the invention (ii), by adjusting a shape and a position of the dividing member which defines the ignition means accommodating chamber, a position where the gas generating agent starts to burn inside the combustion chamber is adjusted and as a result, the ignition and combustion performance of the gas generating agent is optimized.

That is, the present invention provides the gas generator for an air bag comprising a housing having a gas discharging port, and a partition wall member having an annular peripheral wall disposed in the housing, a first combustion chamber for accommodating a first gas generating agent provided radially outside the partition wall member, a disk-like dividing member provided inside the partition wall member to divide the inner space of the partition wall member into a second combustion chamber for accommodating a second gas generating agent and an ignition means accommodating chamber for accommodating ignition means, wherein the second combustion chamber and the ignition means accommodating chamber are arranged adjacent to each other in an axial direction of the partition wall member, interposing the dividing member, the annular peripheral wall is provided with a flame-transferring hole which can make the ignition means accommodating chamber and the first combustion chamber communicated with each other, and the dividing member is disposed in the partition wall member at a position in such a range that a distance from the axial center of the partition wall member is not more than ¼ of an axial average length of the partition wall member.

The partition wall member divides the inner space of the housing into at least two chambers, and includes at least the annular peripheral wall. The partition wall member can be formed into a cylindrical shape or a cylindrical shape with a top.

The dividing member defines two chambers inside the partition wall member, i.e., the second combustion chamber for accommodating the second gas generating agent and the ignition means accommodating chamber for accommodating the ignition means to be adjacent to each other in the axial direction. The dividing member can be formed into a disk-like shape spreading in the radial direction of the annular peripheral wall. It is preferable that the dividing member is formed into a shape to axially close the inside of the partition wall member, for example, into a shape of a horizontal cross section of the inside of the partition wall member.

According to the gas generator, in a so-called multi-stage type gas generator in which two combustion chambers are provided in the housing, the gas generating agents accommodated in the chambers are burned at different timings, it is possible to reduce the volume of the gas generator housing as much as possible, and to enhance the ignition performance of the first gas generating agent.

That is, the first gas generating agent accommodated in the first combustion chamber is ignited and burned by a flame of the ignition means ejected from the flame-transferring hole, and the combustion degree of the entire first gas generating agent in the first combustion chamber differs depending upon a position where the combustion starts i.e. the central portion or end portion of the first combustion chamber.

Thereupon, in this gas generator, the inside of the dividing member is divided into two chambers (a second combustion chamber and an ignition means accommodating chamber) by the partition wall member, both the chambers are arranged adjacent to each other in the axial direction of the partition wall member, and the dividing member is disposed in the partition wall member at a position in such a range that a distance from the axial center of the partition wall member is not more than ¼ of an axial average length of the partition wall member. With this design, the axial length of the ignition means accommodating chamber can be elongated, and the flame-transferring hole which can make the ignition means accommodating chamber and the first combustion chamber communicated with each other can be provided closer to the axial center of the partition wall member.

When the flame-transferring hole is formed closer to the axial center of the partition wall member, preferably, at a position in the range such that a distance from the axial center of the partition wall member is not more than ¼ of an axial average length of the partition wall member, and further when the gas generating agent existing in the axial center of the first combustion chamber is first burned, combustion performance of the first gas generating agent can be enhanced.

The flame-transferring hole can be formed at an optional position by increasing the axial length of the ignition means accommodating chamber. Consequently, a combustion starting position (i.e., a position of the flame-transferring hole) of the gas generating agent in the first combustion chamber can be adjusted optionally in a wide range.

Preferably, the dividing member is provided with a recess which is recessed in the thickness direction of the dividing member on a surface in the ignition means accommodating chamber side, and the recess stores part of the ignition means to be actuated upon receiving the activation signal. When the ignition means comprises an igniter to receive the activation signal and a transfer charge to be ignited and burned by the actuation of the igniter, in particular, the transfer charge can be accommodated in the recess. The transfer charge is provided into the recess, being stored into a container made of a resin or metal. In this case, the container storing the transfer charge has to be formed to break at least due to the activation of the igniter, a material and thickness need to be selected on the basis of this demand. Particularly, an amount of the transfer charge is an important element related to the operation performance of the gas generator, and if the recess is formed larger in the widthwise direction of the dividing member in the gas generator, a sufficient amount of the transfer charge can be arranged. In this case, it is possible to suppress the depth of the recess, and if the width and depth of the recess are adjusted, the flame generated due to the actuation of the igniter can reach the entire transfer charge. And, if the electric ignition type igniter constituting the ignition means is disposed to abut against and face the container accommodating the transfer charge, the transfer charge can be reliably ignited and burnt.

As described above, when the surface of the dividing member on the side of the ignition means accommodating chamber is provided with the recess which is recessed in the thickness direction and the transfer charge or the like is disposed in the recess, the upper surface of the divining member existing in the second combustion chamber side can be made flat without projecting toward the second combustion chamber while the necessary amount of transfer charge for actuation of the gas generator is arranged. As a result, it is possible to define the second combustion chamber as a cylindrical space with an inner surface of a ceiling portion of the housing, an inner surface of the partition wall member and an upper surface of the dividing member. Accordingly, the second combustion chamber can be shortened axially as much as possible but the sufficient space volume is obtained.

If the flame-transferring hole is formed at a height facing the transfer charge, a flame generated due to combustion of the transfer charge can smoothly be ejected, which is preferable.

When the ignition means comprises two electric ignition type igniters, it is preferable to dispose the igniters in different spaces defined in the ignition means accommodating chamber, so that the igniters are activated individually. In this case, if the space having one of the ignition means can be communicated with the second combustion chamber through the communication hole formed in the dividing member in its thickness direction, the second gas generating agent in the second combustion chamber can be ignited by a flame or the like of the igniter ejected from the communication hole.

As the method of disposing the dividing member inside the partition wall member, a method comprising steps such that an inner periphery of the partition wall member is circumferentially step-notched or provided with groove to form an engaging portion for engaging the dividing member, thereby supporting an edge of the dividing member with the engaging member. In this case, if a peripheral wall surface of the dividing member is provided with the pawl spreading like a petticoat, and if the pawl is fitted to the engaging portion, the dividing member can be prevented from being dislocated and sealing between the partition wall member and the dividing member can be realized. And if the peripheral edge of the dividing member is also fitted into the engaging portion, the dividing member can be fixed reliably with the peripheral edge and the pawl. In other words, the dividing means formed in this manner can be easily and reliably disposed inside the partition wall member by fitting the tip of the pawl into the groove, and sealing between the partition wall member and the dividing member can be realized.

If the dividing member is formed in this manner, necessary accommodating space for the transfer charge can be secured, and the dividing member can be preventing from projecting toward the second combustion chamber. That is, the axial length of the second combustion chamber can be suppressed as much as possible while securing necessary space for actuation of the gas generator. Therefore, the dividing member can be disposed at a sufficient distance from the skirt portion of the partition wall member, and a position of the flame-transferring hole (combustion starting position of the first gas generating agent) can be optionally adjusted. If the flame-transferring hole is formed in the vicinity of the axial center of the first combustion chamber, a flame ejected from the flame-transferring hole can reach the entire first combustion chamber, and the ignition and combustion performance of the first gas generating agent accommodated in the first combustion chamber can be enhanced, and thereby, the gas generator can exhibit desired operation performance.

The resilient supporting member for supporting the second gas generating agent can be disposed in the second combustion chamber. The resilient supporting member may include a resilient member and a flat plate-like circular supporting surface which spreads and is accommodated in the radial direction of the second combustion chamber. As the resilient member, various springs such as coil spring and leaf spring can be used. Particularly, if a Belleville spring is used, it is easily combined with the supporting surface, and as a result, it becomes easier to produce the gas generator and the producing cost is reduced.

In the gas generator of the present invention, known technique can be used for constituent elements other than those described above, such as gas generating agent, a coolant means (or filter means) for purifying or cooling gas generated by combustion of the gas generating agent, and a plate member or cushion member for supporting the gas generating agent.

The gas generator for an air bag is accommodated in a module case together with the air bag (bag body) introducing a gas generated by the gas generator to inflate, thereby forming an air bag apparatus. In the air bag apparatus, the gas generator is activated upon the impact sensor detecting the impact, and a combustion gas is discharged from the gas discharging port of the housing. The combustion gas flows into the air bag, the air bag ruptures the module cover and inflates, and forms a cushion for absorbing the impact between hard structural elements in the vehicle and the passenger.

According to the gas generator of the present invention, by adjusting a shape and position of the dividing member dividing the inside of the partition wall member into two chambers axially adjacent to each other, it is possible to optimize the space volume between the second combustion chamber and the ignition means accommodating chamber defined in the partition wall member, and to increase the axial length of the ignition means accommodating chamber as much as possible.

With this, the flame-transferring hole for ejecting a flame or gas generated in the ignition means accommodating chamber towards the first combustion chamber defined outside of the radial direction of the partition wall member can be formed closer to the axial center of the partition wall member and thus, the axial center of the first combustion chamber.

As a result, it is possible to start burning a first gas generating agent closer to the axial center of the first combustion chamber, so that the first gas generating agent can be effectively ignited and burnt.

According to the gas generator of the present invention, by simplifying the structure based on the reduced number of parts, the gas generator in which the manufacturing is facilitated and the producing cost is reduced can be realized. In the gas generator, the overall size of the container can be restricted, and safety and reliability in operation can be secured.

Figure 1:
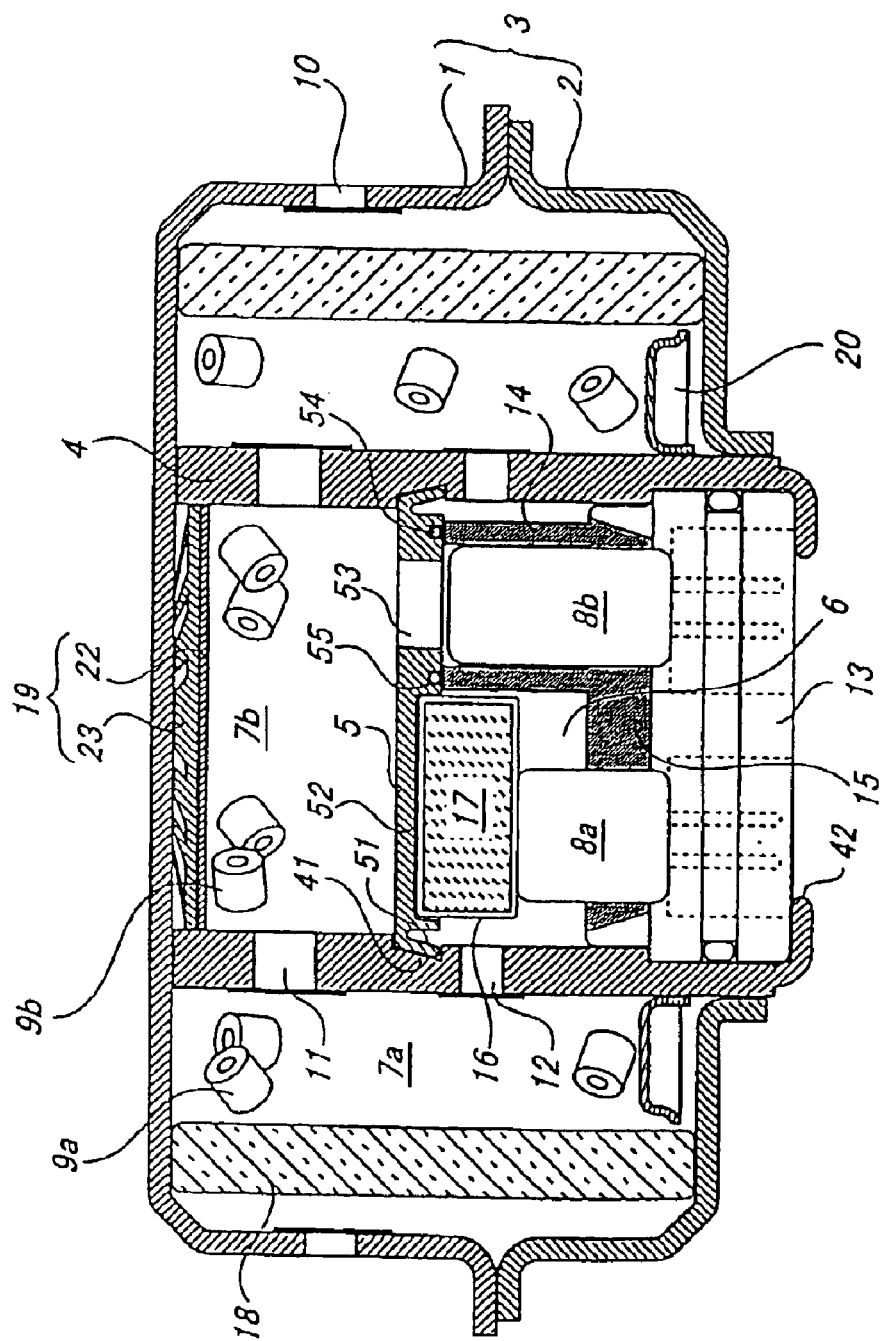
FIG. 1 is a vertical sectional view showing an embodiment of a gas generator of the present invention (I).

DESCRIPTION OF NUMERALS 3 housing
4 inner cylindrical member
5 dividing member
6 ignition means accommodating chamber
7a, b first, second combustion chamber
8a, b first, second igniter
9a, b first, second gas generating agent
10 gas discharging port
11 gas flow hole
12 flame-transferring hole
13 collar member
14 cylindrical container
17 transfer charge
51 pawl
52 recess
53 communication hole
54 annular groove
55 O-ring
200 gas generator
201 impact sensor
2002 control unit
204 air bag
Embodiments of the Invention (I)

A gas generator for an air bag of the present invention will be explained as follows, based on an embodiment shown in the drawings.

FIG. 1 is a vertical sectional view showing a preferred embodiment of the gas generator for an air bag of the present invention, and the gas generator of this embodiment has a structure suitable for being disposed in a driver side.

In this gas generator, a substantially cylindrical inner cylindrical member 4 is disposed in a housing 3 formed by joining a diffuser shell 1, which has a gas discharging port 10, and a closure shell 2 which forms an inner accommodating space together with the diffuser shell 1. The inner cylindrical member 4 corresponds to a partition wall member in the present invention, and its peripheral surface corresponds to an annular peripheral wall.

In this embodiment, the inner cylindrical member 4 is disposed such that a skirt portion 42 thereof extends lower than the diffuser shell 1 to protrude out of the housing 3. And, an inwardly or outwardly shaped flange may be integrally formed with the upper end of the inner cylindrical member, i.e., an end thereof which is in contact with an inner surface of the diffuser shell 1. In this case, the peripheral surface corresponds to the annular peripheral wall, and the cylindrical member can be a partition wall member including the flange.

An annular first combustion chamber 7a is formed outside the inner cylindrical member 4 in the radial direction to accommodate a first gas generating agent 9a. An annular coolant/filter 18 is disposed outside the first combustion chamber 7a in the radial direction, securing a predetermined gap with an inner peripheral surface of the housing 3. The coolant/filter 18 functions to cool and purify a working gas generated by combustion of the gas generating agent, and can be formed by using laminated wire meshes or a similar material.

A dividing member 5 spreading in the radial direction of the inner cylindrical member 4 is disposed inside the inner cylindrical member 4. The dividing member 5 divides a space formed inside the inner cylindrical member 4 into two chambers so that they are adjacent to each other in the axial direction. That is, in this embodiment, inside the inner cylindrical member 4, a second combustion chamber 7b accommodating a second gas generating agent 9b and an ignition means accommodating chamber 6 accommodating ignition means are defined. And, the ignition means accommodating chamber 6 is defined in the skirt portion 42 side of the inner cylindrical member 4, and the second combustion chamber 7b is partitioned by the dividing member 5 and defined in the opposite side of the ignition means accommodating chamber 6.

Figure 2:
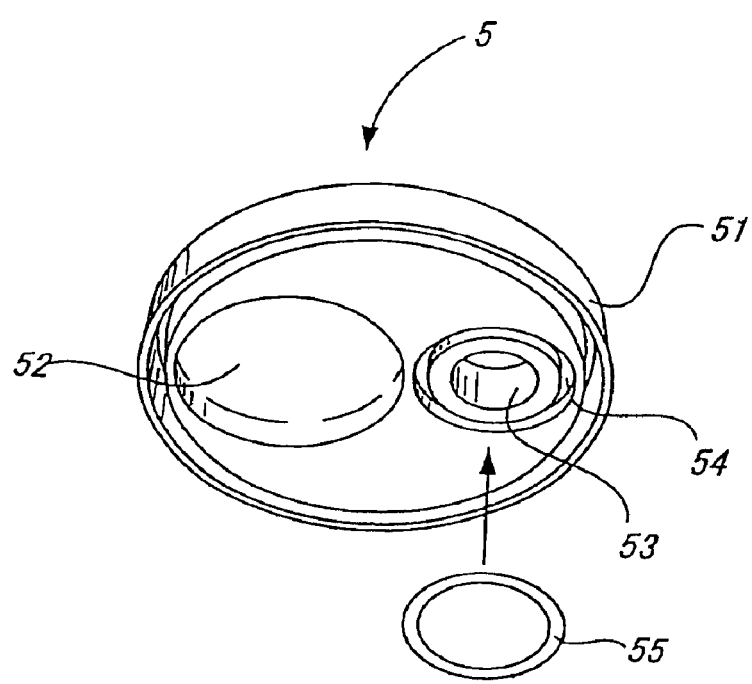
FIG. 2 is an enlarged perspective view of an essential portion showing a dividing member shown in FIGS. 1 and 4.

In this embodiment, as shown in FIG. 2, the dividing member 5 is formed to have a substantially disk-like shape as a whole, and its peripheral surface includes a pawl 51 spreading like a petticoat toward a back surface of the dividing member 5 (i.e., toward the skirt portion 42 of the inner cylindrical member). This pawl 51 may be formed on the entire peripheral surface of the dividing member 5, or a plurality of pawls may be sprinkled at equal intervals. When the pawl 51 is formed on the entire peripheral surface of the dividing member 5, the pawl 51 exhibits a sealing function between the inner cylindrical member 4 and the dividing member 5, which is more preferable.

The pawl 51 is fitted into a groove 41 formed circumferentially in an inner peripheral surface of the inner cylindrical member 4 and fixed in the inner cylindrical member 4. That is, the groove 41 having a size and shape capable of receiving the pawl 51 is formed in the inner peripheral surface of the inner cylindrical member 4 circumferentially along the peripheral surface. Particularly, if the groove 41 is formed deeply enough to receive the peripheral edge of the dividing member 5 as shown in FIG. 1, the peripheral edge and the pawl 51 of the dividing member 5 are fitted into the groove, so that movement of the dividing member 5 is blocked, being fixed inside the inner cylindrical member 4.

Further, by making a tip end and part or all of an outer peripheral surface of the pawl 51 fit tightly to a side surface or a bottom surface of the groove 41 of the partition wall member, sealing between the partition wall member and the dividing member 5 can be obtained. At this time, it is preferable that the pawl 51 and the groove 41 contact with each other closely on wider areas, and therefore a shape of the bottom surface of the groove 41, i.e., a shape of the bottom surface of the groove 41 in its depth direction is desirably a shape capable of abutting against the outer peripheral surface of the pawl 51 received in the groove, more specifically, as shown in FIG. 1, a shape in which the groove 41 inclines to become deeper towards the skirt portion 42.

An ignition means comprising an igniter is disposed in the ignition means accommodating chamber 6. In this embodiment, the ignition means comprises two igniters, a resin member 15 and a collar member 13 for holding the igniters, and a transfer charge 17 disposed to face one of the igniters (first igniter 8a, hereinafter). The two igniters are disposed in parallel to each other in the collar member 13, and are integrally formed by means of the resin member 15, and accommodated inside the skirt portion 42. The resin member 15 which integrates the igniters forms integrally the cylindrical container 14 surrounding a side surface of another igniter (second igniter 8b, hereinafter) than an igniter 8a. The cylindrical container 14 surrounding the second igniter 8b has a length exceeding at least an upper surface of the second igniter 8b, and abuts against a lower surface of the dividing member 5, i.e., a surface in the ignition means accommodating chamber 6 side. As described as follows, this is thus formed in order to easily obtain the sealing between the cylindrical container 14 and the dividing member 5 in the gas generator of this embodiment.

A recess 52 which is recessed in a thickness direction of the dividing member 5 and a communication hole 53 which passes through the dividing member 5 in the thickness direction are formed side by side in a lower surface of the dividing member 5, i.e., in the ignition means accommodating chamber 6 side.

A communication hole 53 is formed oppositely to the second igniter 8b, and an annular groove 54 is formed to surround the communication hole 53. The annular groove 54 is formed oppositely to the cylindrical container 14 surrounding a periphery of the second igniter 8b, and an O-ring 55 is disposed in the annular groove 54. The O-ring 55 in the annular groove 54 reliably seals between the cylindrical container 14 and the dividing member 5 in a state such that the ignition means is disposed in the ignition means accommodating chamber 6. Therefore, the inner space of the cylindrical container 14 where the second igniter 8b is accommodated can communicate with a second combustion chamber 7b through the communication hole 53, and is defined from an inner space of another ignition means accommodating chamber 6 (i.e. a space existing in the first igniter 8a).

The recess 52 formed in the dividing member 5 is formed to accommodate part of the ignition means, i.e., the transfer charge 17 in this embodiment. That is, the transfer charge 17 is accommodated in an accommodation container 16 made of aluminum sheet and then accommodated in the recess 52, and a lower surface thereof is abutted against and supported by the first igniter 8a. Especially in this embodiment, a space between the first igniter 8a and the dividing member 5 is relatively narrow, however, since the recess 52 is sufficiently wide in the radial direction of the housing, a volume for accommodating the transfer charge 17 which is required for actuating the gas generator can be secured. And, by accommodating the transfer charge 17 in the space which is wide in the radial direction and short in the axial direction of the housing in this manner, it is possible to bring the flame of the first igniter 8a over the entire transfer charge 17, which is preferable.

A flame-transferring hole 12 for ejecting flames generated by actuation of the first igniter 8a into the first combustion chamber 7a, and a gas-flow hole 11 which can make the second combustion chamber 7b and the first combustion chamber 7a communicate with each other are formed circumferentially on the peripheral surface of the inner cylindrical member 4. The flame-transferring hole 12 ejects flames of the transfer charge 17 ignited by actuation of the first igniter 8a into the first combustion chamber 7a to ignite and burn the gas generating agent accommodated in the first combustion chamber 7a. Therefore, the flame-transferring hole 12 are formed to make the first igniter 8a, or the space where the transfer charge 17 is accommodated and the first combustion chamber 7a communicated with each other. The gas-flow hole 11 discharges a gas generated by combustion of the second gas generating agent 9b into the first combustion chamber 7a. The gas ejected into the first combustion chamber 7a passes through the first combustion chamber 7a and reaches the coolant/filter 18 and further the gas discharging port 10. The gas flow hole 11 can be closed by a seal tape or other sealing member in order to block an entry of flames from the first combustion chamber 7a, and the flame-transferring hole 12 can be sealed by a seal tape or other sealing member for a purpose of the moisture-proof.

As shown in this embodiment, by defining the second combustion chamber 7b with the substantially disk-like dividing member 5, no projection exists in the combustion chamber, and as a result, a necessary space volume can be secured and the length in the axial direction can be shortened as much as possible. Therefore, the dividing member 5 can be disposed at a higher position (i.e., in the diffuser shell 1 side), and the flame-transferring hole 12 can be formed closer to the center in the axial direction of the first combustion chamber 7a. With this design, the first gas generating agent 9a accommodated in the first combustion chamber 7a is effectively ignited and burned from the substantial center of the axial direction, and as a result, desirable operation performance of the gas generator can be obtained.

The first gas generating agent 9a in the first combustion chamber 7a is disposed in the diffuser shell 1 side and supported by an annular under plate 20 which is fitted outwardly to the inner cylindrical member 4. The second gas generating agent 9b in the second combustion chamber 7b is supported by a circular resilient supporting member 19 having a resilient portion. The resilient supporting member 19 comprises a flat plate-like circular supporting surface 22 in contact with the second gas generating agent 9b, and a Belleville spring 23 which is integrally formed with the supporting surface 22 and becomes a cushion between an inner surface of the diffuser shell and the supporting surface 22. The resilient supporting member 19 is disposed in the second combustion chamber 7b to spread in the radial direction of the second combustion chamber 7b.

With respect to the activation of the gas generator shown in the drawing, when the first igniter 8a receives the activation signal to activate, the transfer charge 17 arranged right thereabove is ignited and burnt, and flames thereof is ejected from the flame-transferring holed 12 into the first combustion chamber 7a. Consequently, the first gas generating agent 9a in the first combustion chamber 7a is ignited and burnt to produce a working gas for inflating an air bag. The working gas is purified and cooled, while passing through the coolant/filter 18 arranged radially outside the first combustion chamber 7a, and then, discharged out of the housing 3 from the gas discharging port 10. Meanwhile, when the second igniter 8b receives the activation signal simultaneously with or slightly after the first igniter 8a to activate, flames and the like generated by the activated igniter is ejected into the second combustion chamber 7b through the communication hole 53 to ignite and burn the second gas generating agent 9b. A working gas generated due to combustion of the second gas generating agent 9b flows into the first combustion chamber 7a through the gas-flow hole 11, and is discharged out of the housing 3 from the gas discharging port 10 in the same manner as the working gas generated in the first combustion chamber 7a.

According to the gas generator having the above structure, the housing 3 can be defined into three chambers with less members. Specifically, the first combustion chamber 7a, the second combustion chamber 7b and the ignition means accommodating chamber 6 can be defined only by the inner cylindrical member 4 and the dividing member 5. The space for accommodating the first igniter 8a in the ignition means accommodating chamber 6 and the space for accommodating the second igniter 8b can be defined by the O-ring 55 and the resin member 15 which integrates the igniters.

As a result, it is possible to reduce the number of parts in the gas generator, its assembling procedure can be simplified, and the manufacturing cost can largely be reduced.

Figure 3:
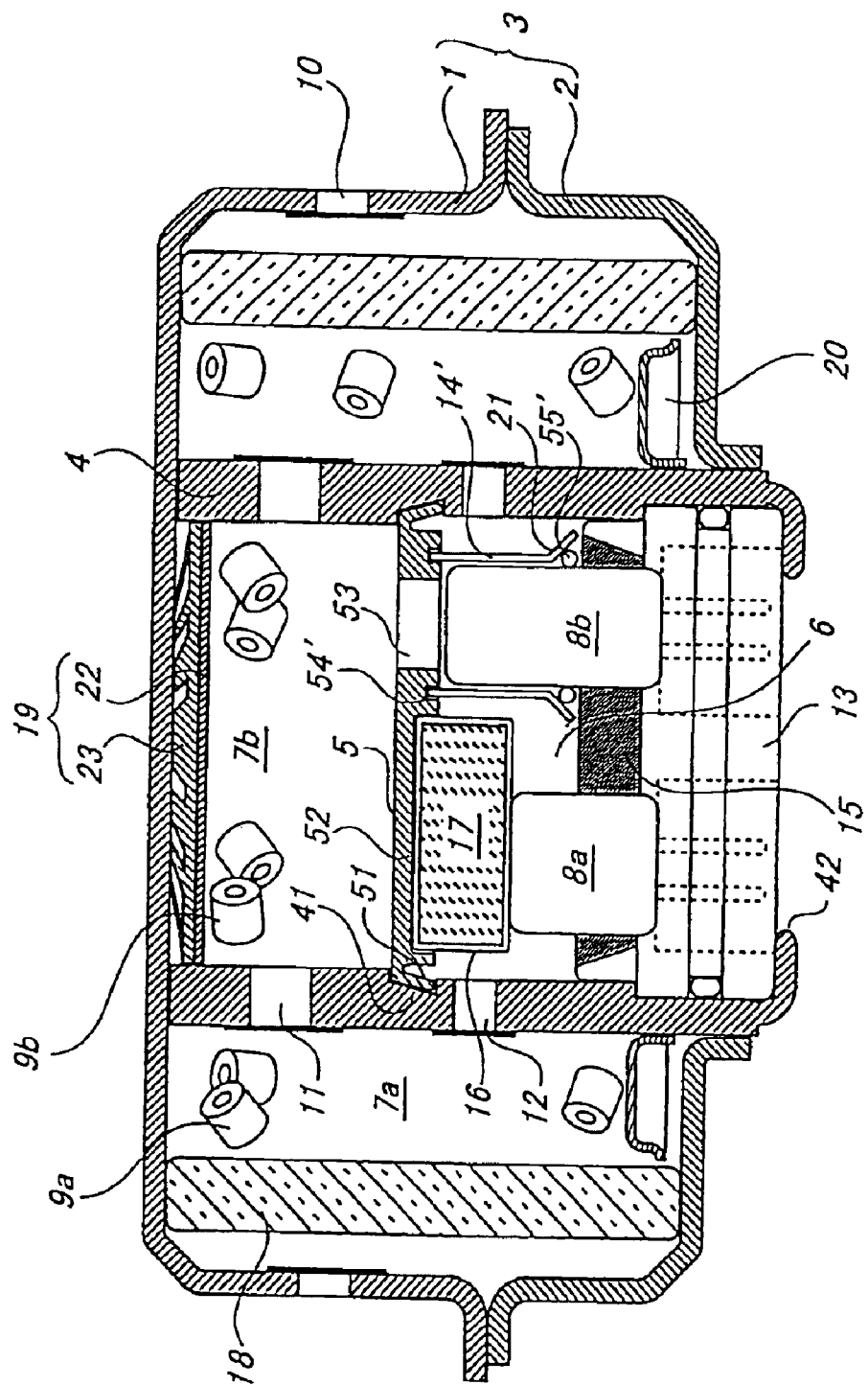
FIG. 3 is a vertical sectional view showing other embodiment of the gas generator of the invention (I).

FIG. 3 shows an embodiment of a gas generator in which the space for accommodating the second igniter 8b and the space for accommodating the first igniter 8a are defined by a seal cup member 14'.

That is, in the gas generator shown in this drawing, the second igniter 8b is accommodated in a substantially cylindrical seal cup member 14' which is partitioned from the space where the first igniter 8a is accommodated.

The entire seal cup member 14' is formed into a substantially annular shape as a whole, and its lower end is formed with an opening portion 21 which spreads outwardly in the radial direction like a bugle. An annular groove 54' is formed in the dividing member 5 in the ignition means accommodating chamber 6 side, and an upper end of the seal cup member 14' is press-fitted or fitted into the annular groove 54'. With this, a gas and flame do not pass through an engaged portion between the dividing member 5 and the seal cup member 14'. Further, when the transfer charge 17 is burned, its gas pressure is applied in the radial direction of the seal cup member 14', and as a result, the seal cup member 14' is fastened so that sealing between the dividing member 5 and the seal cup member 14' can be obtained unfailingly.

An O-ring 55' is disposed inside the opening portion 21 of the seal cup member 14' and also between the opening portion 21 and the second igniter 8b accommodated in the seal cup member 14'. The O-ring 55, seals between the second igniter 8b and the seal cup. Especially with this design, it is possible to prevent a gas and flame from being blown toward the O-ring 55' and thus, a versatile rubber, for example nitrile rubber can be used for an O-ring 55'.

In FIG. 3, other structures are designated with the same symbols as those in FIG. 1, and explanation thereof will be omitted.

Figure 5:
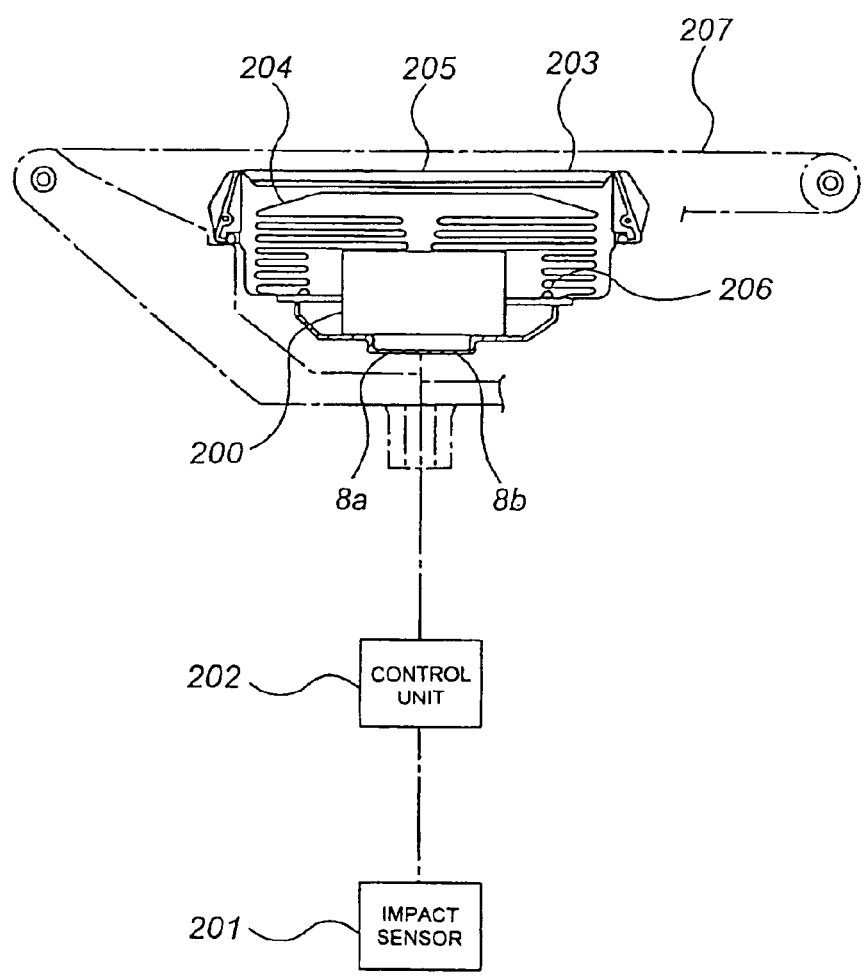
FIG. 5 shows a structure of an air bag apparatus of the invention (I) and (II).

FIG. 5 shows an embodiment of an air bag apparatus of the present invention including the gas generator shown in FIG. 1 or 3.

The air bag apparatus comprises a gas generator 200, an impact sensor 201, a control unit 202, a module case 203 and an air bag 204. The gas generator explained based on FIG. 1 or 3 is used as the gas generator 200, and its actuation performance is adjusted to give as a small impact as possible to the passenger in the initial stage of the actuation in the gas generator.

The impact sensor 201 comprises a semiconductor type acceleration sensor. The semiconductor type acceleration sensor comprises four semiconductor gages formed on a beam of a silicon substrate which bends when acceleration is applied thereto. The semiconductor gages are bridge-connected. If the acceleration is applied, the beam bends, and a strain is generated on its surface. With this strain, resistance of the semiconductor gage is varied, and the variation in resistance is detected as a voltage signal corresponding to the acceleration.

The control unit 202 includes an ignition judging circuit. A signal from the semiconductor type acceleration sensor is inputted to this ignition judging circuit. If the impact signal from the sensor 201 exceeds a certain value, the control unit 202 starts calculation, and if a result of the calculation exceeds a certain value, the control unit 202 outputs the actuation signal to the igniters 8a, 8b of the gas generator 200.

The module case 203 is made of polyurethane for example, and includes a module cover 205. The air bag 204 and the gas generator 200 are accommodated in the module case 203 to constitute a pad module. When the pad module is mounted to a driver side of an automobile, the pad module is usually mounted in a steering wheel 207.

The air bag 204 is made of nylon (e.g., nylon 66) or polyester, a bag opening 206 of the air bag 204 surrounds the gas discharging ports of the gas generator, and the air bag 204 is fixed to a flange of the gas generator in a folded state.

When the semiconductor type acceleration sensor 201 detects an impact at the time of collision of the automobile, a signal therefrom is sent to the control unit 202, and if the impact signal from the sensor exceeds a certain value, the control unit 202 starts calculation. If the result of the calculation exceeds a certain value, the control unit 202 outputs the actuation signal to the igniters 8a and 8b of the gas generator 200, thereby actuating the igniters 8a and 8b to ignite the gas generating agents. And the gas generating agents are burnt to generate a gas. The gas ejects into the air bag, and the air bag breaks the module cover 205 to inflate, thereby forming a cushion between the steering wheel 207 and the passenger to absorb the impact.

Embodiment of the Invention (II)

A gas generator for an air bag of the present invention will be explained as follows, based on an embodiment shown in the drawings.

Figure 4:
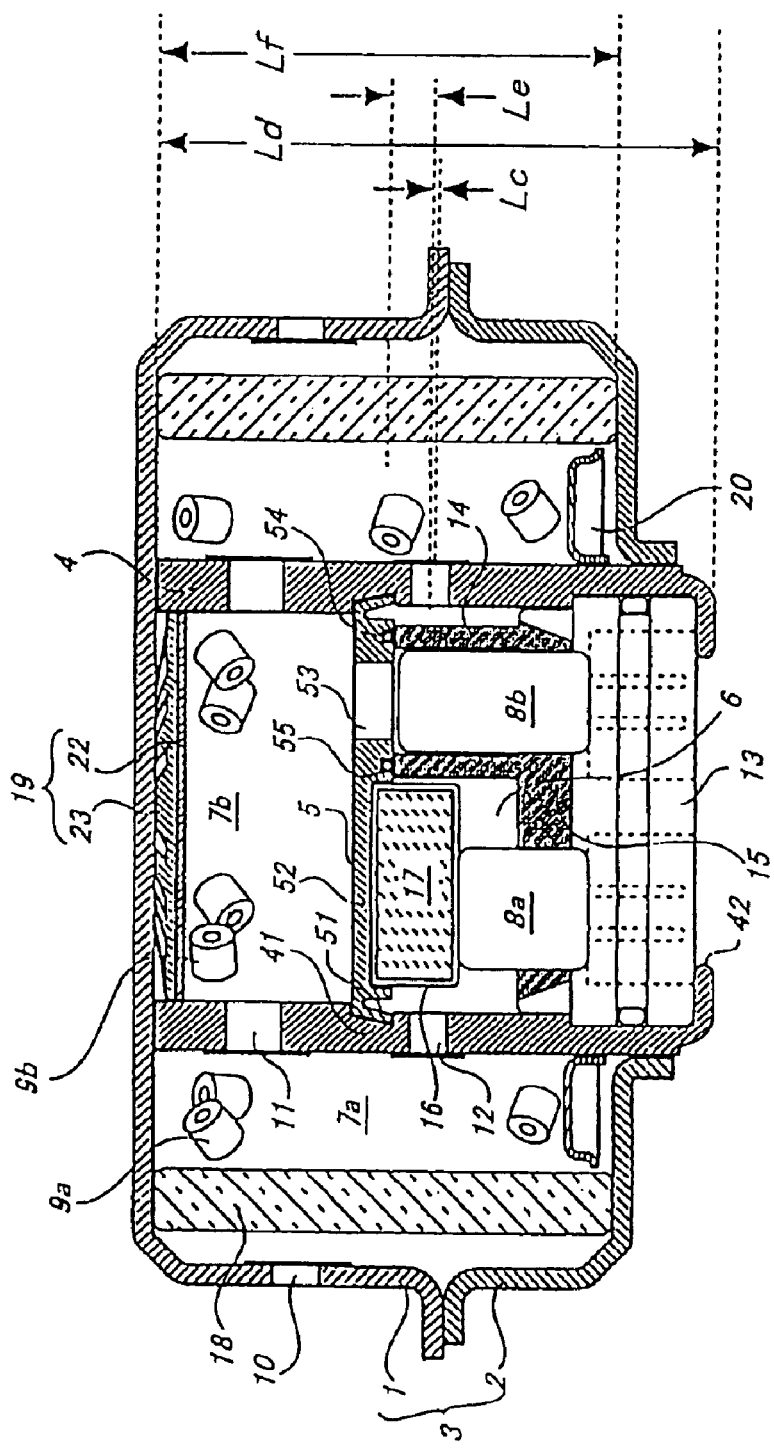
FIG. 4 is a vertical sectional view showing other embodiment of the gas generator of the invention (II).

FIG. 4 is a vertical sectional view showing a preferred embodiment of the gas generator for an air bag of the present invention, and the gas generator of this embodiment has a structure suitable for being disposed in a driver side.

In this gas generator, a substantially cylindrical inner cylindrical member 4 is disposed in a housing 3 formed by joining a diffuser shell 1, which has a gas discharging port 10, and a closure shell 2 which forms an inner accommodating space together with the closure shell 1. The inner cylindrical member 4 corresponds to a partition wall member in the present invention, and its peripheral surface corresponds to an annular peripheral wall.

In this embodiment, the inner cylindrical member 4 is disposed such that a skirt portion 42 thereof extends lower than the diffuser shell 1 to protrude out of the housing 3. And, an inwardly or outwardly shaped flange may be integrally formed with the upper end of the inner cylindrical member, i.e., an end thereof which is in contact with an inner surface of the diffuser shell 1. In this case, the peripheral surface corresponds to the annular peripheral wall, and the cylindrical member can be a partition wall member including the flange.

An annular first combustion chamber 7a is formed outside the inner cylindrical member 4 in the radial direction to accommodate a first gas generating agent 9a. An annular coolant/filter 18 is disposed outside the first combustion chamber 7a in the radial direction, securing a predetermined gap with an inner peripheral surface of the housing 3. The coolant/filter 18 functions to cool and purify a working gas generated by combustion of the gas generating agent, and can be formed by using laminated wire meshes or a similar material. In other words, the first combustion chamber is provided outside the inner cylindrical member 4 but inside the coolant/filter 18.

A disk-like dividing member 5 spreading in the radial direction of the inner cylindrical member 4 is disposed inside the inner cylindrical member 4. The dividing member 5 divides a space formed inside the inner cylindrical member 4 into two chambers so that they are adjacent to each other in the axial direction. That is, in this embodiment, the inside the inner cylindrical member 4 is divided into a second combustion chamber 7b accommodating a second gas generating agent 9b and an ignition means accommodating chamber 6 accommodating ignition means. And, the ignition means accommodating chamber 6 is defined in the skirt portion 42 side of the inner cylindrical member 4, and the second combustion chamber 7b is partitioned by the dividing member 5 and defined in the opposite side of the ignition means accommodating chamber 6.

The dividing member 5 which defines both the chambers has a substantially disk-like shape as a whole as shown in FIG. 2, and an upper surface of the dividing member 5 existing in the second combustion chamber 7b is formed flat. Accordingly, the second combustion chamber 7b is formed as a cylindrical space which is defined by an inner surface of the diffuser shell 1, an inner peripheral surface of the inner cylindrical member 4 and an upper surface of the dividing member 5. Thus, the second combustion chamber can obtain a necessary space volume, and the length thereof in the axial direction can be shortened as much as possible. This means that the ignition means accommodating chamber can be formed long in the axial direction.

And, on a peripheral surface of the dividing member 5 includes a pawl 51 spreading like a petticoat toward a back surface of the dividing member 5 (i.e., toward the skirt portion 42 of the inner cylindrical member) is formed. This pawl 51 may be formed on the entire peripheral surface of the dividing member 5, or a plurality of pawls may be sprinkled at equal intervals. When the pawl 51 is formed on the entire peripheral surface of the dividing member 5, the pawl 51 exhibits a sealing function between the inner cylindrical member 4 and the dividing member 5, which is more preferable.

The pawl 51 is fitted into a groove 41 formed circumferentially in an inner peripheral surface of the inner cylindrical member 4 and fixed in the inner cylindrical member 4. That is, the groove 41 having a size and shape capable of receiving the pawl 51 is formed in the inner peripheral surface of the inner cylindrical member 4 circumferentially along the peripheral surface. Particularly, if the groove 41 is formed deeply enough to receive the peripheral edge of the dividing member 5 as shown in FIG. 4, the peripheral edge and the pawl 51 of the dividing member 5 are fitted into the groove, so that movement of the dividing member 5 is blocked, being fixed inside the inner cylindrical member 4.

Further, by making a tip end and part or all of an outer peripheral surface of the pawl 51 fit tightly to a side surface or a bottom surface of the groove 41 of the partition wall member, sealing between the partition wall member and the dividing member 5 can be obtained. At this time, it is preferable that the pawl 51 and the groove 41 contact with each other closely on wider areas, and therefore a shape of the bottom surface of the groove 41, i.e., a shape of the bottom surface of the groove 41 in its depth direction is desirably a shape capable of abutting against the outer peripheral surface of the pawl 51 received in the groove, more specifically, as shown in FIG. 4, a shape in which the groove 41 inclines to become deeper towards the skirt portion 42.

An ignition means comprising an igniter is disposed in the ignition means accommodating chamber 6. In this embodiment, the ignition means comprises two igniters 8a and 8b, a resin 15 and a collar member 13 for holding the igniters, and a transfer charge 17 disposed to face one of the igniters (first igniter 8a, hereinafter). The two igniters are disposed in parallel to each other in the collar member 13, and are integrally formed by means of the resin 15, and accommodated inside the skirt portion 42. The resin 15 which integrates the igniters forms integrally the cylindrical container 14 surrounding a side surface of another igniter (second igniter 8b, hereinafter) than an igniter 8a. The cylindrical container 14 surrounding the second igniter 8b has a length exceeding at least an upper surface of the second igniter 8b, and abuts against a lower surface of the dividing member 5, i.e., a surface in the ignition means accommodating chamber 6 side. As described as follows, this is thus formed in order to easily obtain the sealing between the cylindrical container 14 and the dividing member 5 in the gas generator of this embodiment.

A recess 52 which is recessed in a thickness direction of the dividing member 5 and a communication hole 53 which passes through the dividing member 5 in the thickness direction are formed side by side in a lower surface of the dividing member 5, i.e., in the ignition means accommodating chamber 6 side.

A communication hole 53 is formed oppositely to the second igniter 8b, and an annular groove 54 is formed to surround the communication hole 53. The annular groove 54 is formed oppositely to the cylindrical container 14 surrounding a periphery of the second igniter 8b, and an O-ring 55 is disposed in the annular groove 54. The O-ring 55 in the annular groove 54 reliably seals between the cylindrical container 14 and the dividing member 5 in a state such that the ignition means is disposed in the ignition means accommodating chamber 6. Therefore, the inner space of the cylindrical container 14 where the second igniter 8b is accommodated can communicate with a second combustion chamber 7b through the communication hole 53, and is defined from an inner space of another ignition means accommodating chamber 6 (i.e. a space existing in the first igniter 8a).

The recess 52 formed in the dividing member 5 is formed to accommodate part of the ignition means, i.e., the transfer charge 17 in this embodiment. That is, the transfer charge 17 is accommodated in an accommodation container 16 made of aluminum sheet and then accommodated in the recess 52, and a lower surface thereof is abutted against and supported by the first igniter 8a. Especially in this embodiment, a space between the first igniter 8a and the dividing member 5 is relatively narrow, however, since the recess 52 is sufficiently wide in the radial direction of the housing, a volume for accommodating the transfer charge 17 which is required for actuating the gas generator can be secured. And, by accommodating the transfer charge 17 in the space which is wide in the radial direction and short in the axial direction of the housing in this manner, it is possible to bring the flame of the first igniter 8a over the entire transfer charge 17, which is preferable.

In this embodiment, a flame-transferring hole 12 for ejecting flames generated by actuation of the first igniter 8a into the first combustion chamber 7a, and a gas-flow hole 11 which can make the second combustion chamber 7b and the first combustion chamber 7a communicated with each other are formed circumferentially on the peripheral surface of the inner cylindrical member 4 which is a partition wall member.

The flame-transferring hole 12 ejects flames of the transfer charge 17 ignited by actuation of the first igniter 8a into the first combustion chamber 7a to ignite and burn the gas generating agent accommodated in the first combustion chamber 7a. Therefore, the flame-transferring hole 12 are formed to make the first igniter 8a, or the space where the transfer charge 17 is accommodated and the first combustion chamber 7a communicated with each other.

In this embodiment, as described above, the upper surface of the dividing member 5 existing in the second combustion chamber 7b side is formed flat and thus, no projection exists in the second combustion chamber 7b. As a result, the second combustion chamber can secure a necessary space volume, and has a length in the axial direction shortened as much as possible. Therefore, the dividing member 5 can be disposed at a higher position (i.e., in the diffuser shell 1 side), and, the axial length of the ignition means accommodating chamber can be made long. With this design, the flame-transferring hole 12, which is formed in the ignition means accommodating chamber side inside the inner cylindrical member 4, can be formed in such a range that a length (Lc) from the axial center of the inner cylindrical member 4 is not more than ¼ (i.e., Lc≦Ld/4) of the average axial length (Ld) of the partition wall member. Further, a position where the dividing member 5 is located in the inner cylindrical member 4 of the partition wall member can be set to such a range that a distance from the axial center of the inner cylindrical member 4 is not more than ¼ of the average axial length Ld of the inner cylindrical member 4.

And, the first combustion chamber is formed outside the inner cylindrical member 4, so that, if the flame-transferring hole 12 is formed in the range of Lc≦Ld/4 as described above, the flame-transferring hole 12 can be formed closer to the axial center of the first combustion chamber 7a. That is, the flame-transferring hole 12 can be formed at a position in the range such that the distance (Le) from the axial center of the average length of the first combustion chamber is not more than ¼ of the axial average length (Lf) of the first combustion chamber.

Therefore, the first gas generating agent 9a accommodated in the first combustion chamber 7a is effectively ignited and burned from the substantially axial center, and as a result, preferable operation performance of the gas generator can be obtained.

The gas-flow hole 11 discharges a gas generated by combustion of the second gas generating agent 9b into the first combustion chamber 7a. The gas ejected into the first combustion chamber 7a passes through the first combustion chamber 7a and reaches the coolant/filter 18 and further the gas discharging port 10. The gas flow hole 11 can be closed by a seal tape or other sealing member in order to block an entry of flames from the first combustion chamber 7a, and the flame-transferring hole 10 can be sealed by a seal tape or other sealing member for a purpose of the moisture-proof.

The first gas generating agent 9a in the first combustion chamber 7a is disposed in the diffuser shell 1 side and supported by an annular under plate 20 which is fitted outwardly to the inner cylindrical member 4. The second gas generating agent 9b in the second combustion chamber 7b is supported by a circular resilient supporting member 19 having a resilient portion. The resilient supporting member 19 comprises a flat plate-like circular supporting surface 22 in contact with the second gas generating agent 9b, and a Belleville spring 23 which is integrally formed with the supporting surface 22 and becomes a cushion between an inner surface of the diffuser shell and the supporting surface 22. The resilient supporting member 19 is disposed in the second combustion chamber 7b to spread in the radial direction of the second combustion chamber 7b.

With respect to the activation of the gas generator shown in the drawing, when the first igniter 8a receives the activation signal to activate, the transfer charge 17 arranged right thereabove is ignited and burnt, and flames thereof is ejected from the flame-transferring holed 12 into the first combustion chamber 7a. Consequently, the first gas generating agent 9a in the first combustion chamber 7a is ignited and burnt to produce a working gas for inflating an air bag. The working gas is purified and cooled, while passing through the coolant/filter 18 arranged radially outside the first combustion chamber 7a, and then, discharged out of the housing 3 from the gas discharging port 41. Meanwhile, when the second igniter 8b receives the activation signal simultaneously with or slightly after the first igniter 8a to activate, flames and the like generated by the activated igniter is ejected into the second combustion chamber 7b through the communication hole 53 to ignite and burn the second gas generating agent 9b. A working gas generated due to combustion of the second gas generating agent 9b flows into the first combustion chamber 7a through the gas-flow hole 11, and is discharged out of the housing 3 from the gas discharging port 10 in the same manner as the working gas generated in the first combustion chamber 7a.

According to the gas generator having the above structure, the housing 3 can be defined into three chambers with less members. Specifically, the first combustion chamber 7a, the second combustion chamber 7b and the ignition means accommodating chamber 6 can be defined only by the inner cylindrical member 4 and the dividing member 5. The space for accommodating the first igniter 8a in the ignition means accommodating chamber 6 and the space for accommodating the second igniter 8b can be defined by the O-ring 55 and the resin 15 which integrates the igniters.

As a result, it is possible to reduce the number of parts in the gas generator, its assembling procedure can be simplified, and the manufacturing cost can largely be reduced.

FIG. 5 shows an embodiment of an air bag apparatus of the present invention including the gas generator shown in FIG. 4.

The air bag apparatus comprises a gas generator 200, an impact sensor 201, a control unit 202, a module case 203 and an air bag 204. The gas generator explained based on FIG. 4 or 3 is used as the gas generator 200, and its actuation performance is adjusted to give as a small impact as possible to the passenger in the initial stage of the actuation in the gas generator.

The impact sensor 201 comprises a semiconductor type acceleration sensor. The semiconductor type acceleration sensor comprises four semiconductor gages formed on a beam of a silicon substrate which bends when acceleration is applied thereto. The semiconductor gages are bridge-connected. If the acceleration is applied, the beam bends, and a strain is generated on its surface. With this strain, resistance of the semiconductor gage is varied, and the variation in resistance is detected as a voltage signal corresponding to the acceleration.

The control unit 202 includes an ignition judging circuit. A signal from the semiconductor type acceleration sensor is inputted to this ignition judging circuit. If the impact signal from the sensor 201 exceeds a certain value, the control unit 202 starts calculation, and if a result of the calculation exceeds a certain value, the control unit 202 outputs the actuation signal to the igniters 8a, 8b of the gas generator 200.

The module case 203 is made of polyurethane for example and includes a module cover 205. The air bag 204 and the gas generator 200 are accommodated in the module case 203 to constitute a pad module. When the pad module is mounted to a driver side of an automobile, the pad module is usually mounted in a steering wheel 207.

The air bag 204 is mad e of nylon (e.g., nylon 66) or polyester, a bag opening 206 of the air bag 304 surrounds the gas discharging ports of the gas generator, and the air bag 204 is fixed to a flange of the gas generator in a folded state.

When the semiconductor type acceleration sensor 201 detects an impact at the time of collision of the automobile, a signal therefrom is sent to the control unit 202, and if the impact signal from the sensor exceeds a certain value, the control unit 202 starts calculation. If the result of the calculation exceeds a certain value, the control unit 202 outputs the actuation signal to the igniters 8a and 8b of the gas generator 200, thereby actuating the igniters 8a and 8b to ignite the gas generating agents. And the gas generating agents are burnt to generate a gas. The gas ejects into the air bag, and the air bag breaks the module cover 205 to inflate, thereby forming a cushion between the steering wheel 207 and the passenger to absorb the impact.

What is claimed is:

1. A gas generator for an air bag, comprising:
   a housing having a gas discharging port;
   a partition wall member having an annular peripheral wall disposed in the housing for dividing an inner space of the housing into at least two chambers, an inner peripheral surface of the annular peripheral wall having a groove formed in a circumferential direction thereof; and
   a dividing member in the form of a disk disposed inside the partition wall member and extending in a radial direction of the annular peripheral wall, a peripheral surface of the dividing member being provided with a pawl that tapers outwardly in a thickness direction of the dividing member, and the pawl being fitted in the groove, wherein an end portion or an outer peripheral surface of the pawl makes contact tightly with a side surface or a bottom surface of the groove.

2. A gas generator for an air bag according to claim 1, wherein an ignition means accommodating chamber is provided inside the partition wall member at a tip end side of the pawl, an ignition means is accommodated in the ignition means accommodation chamber, and the ignition means includes an igniter adapted to receive an activation signal and a transfer charge adapted to be ignited and burned by actuation of the igniter.

3. A gas generator for an air bag, comprising:
   a housing having a gas discharging port;
   a partition wall member having an annular peripheral wall disposed in the housing for dividing an inner space of the housing into at least two chambers, an inner peripheral surface of the annular peripheral wall having a groove formed in a circumferential direction thereof;
   ignition means having an igniter accommodated inside the partition wall member, the igniter being disposed in a skirt portion side of the partition wall member; and
   a dividing member in the form of a disk disposed inside the partition wall member and extending in a radial direction of the annular peripheral wall, a peripheral surface of the dividing member being provided with a pawl that tapers outwardly toward a skirt portion of the partition wall member, and the pawl being fitted in the groove, wherein an end portion or an outer peripheral surface of the pawl makes contact tightly with a side surface or a bottom surface of the groove.

4. A gas generator for an air bag according to one of claims 1 and 3, wherein a first combustion chamber in which a gas generating agent is accommodated is provided radially outside the partition wall member, and the annular peripheral wall is formed with a flame-transferring hole that communicates the first combustion chamber and an ignition means accommodating chamber.

5. A gas generator for an air bag according to one of claims 1, and 3, wherein the dividing member is disposed inside the partition wall member to define an ignition means accommodating chamber for accommodating an ignition means in a skirt portion side of the annular peripheral wall, a combustion chamber for accommodating a gas generating agent is formed on the opposite side of the ignition means accommodating chamber partitioned by the dividing member, and the dividing member is formed with a communication hole which is open at said combustion chamber.

6. A gas generator for an air bag according to claim 5, further comprising:
   a resilient supporting member for supporting the gas generating agent is disposed in the combustion chamber, the resilient supporting member including a resilient member and a flat circular supporting surface spreading in a radial direction of the combustion chamber.

7. An air bag apparatus, comprising:
   a gas generator for an air bag according to one of claims 1 and 3;
   an impact sensor for sensing an impact to actuate the gas generator;
   an air bag to which gas generated by the gas generator is introduced to inflate; and
   a module case for accommodating the air bag.

8. A gas generator for an air bag, comprising:
   a housing having a gas discharging port;
   a partition wall member having an annular peripheral wall disposed in the housing for dividing an inner space of the housing into at least two chambers;
   a dividing member in the form of a disk disposed inside the partition wall member and extending in a radial direction of the annular peripheral wall and defining an ignition means accommodating chamber in a skirt portion side of the partition wall member; and ignition means including at least two igniters accommodated inside the partition wall member, the igniters being disposed in the skirt portion side of the partition wall member, wherein one of the igniters is accommodated inside a cylindrical seal cup member divided from a space where the other igniter is provided and wherein the seal cup member is formed at a lower end with an opening portion spreading radially, an upper end of the seal cup member is press-fitted into a groove formed in the dividing member, an O-ring is disposed inside the opening portion of the seal cup member, between the seal cup member and the igniter accommodated in the seal cup member in order to seal between the igniter and the seal cup member.

9. A gas generator for an air bag, comprising:

a housing having a gas discharging port;

a partition wall member having an annular peripheral wall disposed in the housing for dividing an inner space of the housing into at least two chambers, an inner peripheral surface of the annular peripheral wall having a groove formed in a circumferential direction thereof; and a dividing member in the form of a disk disposed inside the partition wall member and extending in a radial direction of the annular peripheral wall, a peripheral surface of the dividing member constituting a pawl that tapers outwardly in a thickness direction of the dividing member, and the pawl being fitted in the groove, wherein an end portion or an outer peripheral surface of the pawl makes contact tightly with a side surface or a bottom surface of the groove.

10. A gas generator for an air bag, comprising:

a housing having a gas discharging port;

a partition wall member having an annular peripheral wall disposed in the housing for dividing an inner space of the housing into at least two chambers, an inner peripheral surface of the annular peripheral wall having a groove fanned in a circumferential direction thereof;

ignition means having an igniter accommodated inside the partition wall member, the igniter being disposed in a skirt portion side of the partition wall member; and a dividing member in the form of a disk disposed inside the partition wall member and extending in a radial direction of the annular peripheral wall, a peripheral surface of the dividing member constituting a pawl that tapers outwardly toward a skirt portion of the partition wall member, and the pawl being fitted in the groove, wherein an end portion or an outer peripheral surface of the pawl makes contact tightly with a side surface or a bottom surface of the groove.

* * * * *